Patented Sept. 23, 1947

2,427,942

UNITED STATES PATENT OFFICE 2,427,942

VULCANIZATION OF BUTADIENE-STYRENE COPOLYMER

Theodore A. Bulifant, Hackensack, N. J., assignor to Allied Chemical & Dye Corporation, New York, N. Y., a corporation of New York No Drawing. Application February 10, 1944, Serial No. 521,846

11 Claims. (Cl. 260—41)

This invention relates to the art of compounding substitutes for natural rubber and more particularly to compounding butadiene-styrene copolymer.

Black vulcanizates (products of vulcanization) of butadiene-styrene copolymer, frequently designated as Buna S and more recently as G R-S synthetic rubber, of commercially satisfactory tensile strength and otherwise suitable for many practical uses may be obtained by incorporating certain carbon-black fillers, particularly channel black, in the copolymer prior to vulcanization. There is, however, a large industry and consumer demand for vulcanized rubber and rubber-like products of light color, e. g. white, gray, red, etc., that cannot be met by black vulcanizates containing carbon-black fillers. In the case of natural rubber, this need has been met successfully by using white or light-colored fillers such as calcium carbonate, clay, etc. It has been found, however, that such fillers, satisfactorily employed in making non-black vulcanizates from natural rubber, do not impart to butadiene-styrene copolymer sufficient tensile strength and tear resistance for the manufacture of satisfactory products.

It is an object of this invention to improve the tear-resisting and tensile properties of vulcanizates of butadiene-styrene copolymer using as fillers relatively large amounts of non-black metal oxides which have heretofore been used primarily in relatively small amounts as pigments in compounding natural rubber.

It is a further object of the invention to provide a process of compounding butadiene-styrene copolymer with non-black metal oxide fillers so as to obtain vulcanizates of improved tensile and tear-resisting properties. Other objects and advantages will appear hereinafter.

This invention involves the discovery that, by compounding butadiene-styrene copolymer with non-black metal oxide fillers selected from the group consisting of aluminum oxide, titanium dioxide, zinc oxide and iron oxide in amount sufficient to provide at least 20 volumes of filler for each 100 volumes of the copolymer, and paracoumarone resin of a melting point above 75° C., preferably from 100° to 140° C., a surprising improvement in the tensile and tear-resisting properties of the copolymer vulcanizates is obtained. Preferably from 15 to 30 parts by weight of paracoumarone resin are employed for each 100 parts by weight of the copolymer and from 20 to 60 parts by volume of the filler are employed for each 100 parts by volume of the copolymer.

A vulcanizing agent, usually sulfur, and vulcanizing accelerator are dispersed in the copolymer prior to vulcanization. Where metal oxide other than zinc oxide is employed as the filler, a metal oxide which activates the accelerator is also incorporated in the copolymer prior to vulcanization.

I have found that by compounding butadiene-styrene copolymer with such metal oxide fillers are paracoumarone resin of a melting point above 75° C., a remarkable increase in the tensile strength and tear resistance of the vulcanizates, as compared with vulcanizates containing the same amount of filler and other softeners or no softener, is accomplished. The elongations of the vulcanizates under given stress and at the breaking point are also increased. The improvement is of such magnitude that the vulcanizates produced in accordance with the invention may be employed for certain purposes for which non-black butadiene-styrene copolymer vulcanizates heretofore had little or no utility. For example, as described more fully hereinbelow, use of paracoumarone resin in accordance with the invention increased the tensile strength of vulcanizates to as much as two or three times that of vulcanizates containing no paracoumarone resin. Heretofore, non-black butadiene-styrene copolymer vulcanizates compounded with non-black fillers possessed insufficient tensile strength or tear resistance or both for most purposes for which the corresponding non-black natural rubber vulcanizates were employed. However, non-black vulcanizates compounded in accordance with the invention, owing to their improved tensile and tear-resisting properties, may be satisfactorily employed as substitutes for vulcanized non-black natural rubber in many applications. The vulcanizates are of relatively high specific gravity and hence are preferably employed for purposes for which low gravity vulcanizates are not required.

Preferably metal oxide fillers of fine or ultra-fine particle size, at least 90% of the particles of which do not exceed 15 microns in diameter or thickness, are employed. Metal oxide fillers having an average particle size of less than 1 micron are particularly preferred.

The paracoumarone resin employed in accordance with the invention may be produced by catalytic or heat-polymerization of the polymerizable constituents of oils recovered from coal-tar and water-gas-tar by distillation, oils obtained in the production of such tars and oils collecting in manufactured gas distribution and storage systems. Examples of such oils are solvent naphtha, crude benzol, toluol, and xylol, light oil and drip oils. Such oils contain varying but substantial amounts of unsaturated resin-forming constituents such as coumarone, indene, styrene and their homologs, and the resins produced from these oils may contain polymerization products of two or more of these constituents. The oil fractions employed in making the resins boil within the range of 125° to 200° C., preferably 150° to 200° C., and may contain minor amounts of polymerizable materials boiling without these ranges. The relative amounts of constituents in commercial resins and the physical properties of the resins will depend on several factors, well known in the art, such as, for example, boiling range of the oil fraction, temperature and time of polymerization, nature and amount of catalyst used, if any. Starting with a given oil fraction, the composition and properties of resins will depend largely on polymerization conditions, e. g. whether polymerization is effected by heat or by use of a catalyst such as 66 Bé. sulfuric acid. The expression "paracoumarone resin" as employed herein includes such catalyst-polymerized and heat-polymerized products. As hereinabove pointed out, the resin should have a melting point of at least 75° C., preferably between 100° and 140° C. If desired, resin of the preferred melting point may be made by blending paracoumarone resin of high melting point, say 160° C., with sufficient high boiling oil, e. g. coal-tar oil boiling within the range of 200° to 350° C., to produce a mixture of the desired melting point.

In addition to the filler and paracoumarone resin the butadiene-styrene copolymer should be compounded with suitable amounts of vulcanizing agent, preferably sulfur, vulcanizing accelerator and aliphatic fatty acid such as stearic acid. The sulfur is employed in proportions by weight of from 1 to 5 parts, preferably about 2 parts for each 100 parts of the copolymer. Any accelerator capable of accelerating vulcanization of the copolymer, either alone or in combination with an activating accelerator, may be utilized. Examples of the accelerator types are: aldehyde-amines, such as formaldehyde-aniline reaction products and butyraldehyde-aniline reaction products; guanidines, such as diphenylguanidine and diphenylguanidine oxalate; thiazoles, such as 2-mercaptobenzothiazole, mixed dimethyl and ethyl thiazyldisulfides, and benzothiazyl-2-monocyclohexylsulfenamide; thiazolines, such as mercaptothiazoline; thiuram sulfides, such as tetramethylthiuram monosulfide and tetramethylthiuramidisulfide; and dithiocarbamates, such as n-pentamethylene ammonium pentamethylenedithiocarbamate and zinc dimethyldithiocarbamate. From 3 to 10 parts by weight of a metallic oxide capable of activating the accelerator, preferably about 5 parts of zinc oxide, should be incorporated in each 100 parts of the copolymer; other accelerator-activating metallic oxides are litharge and magnesium oxide. Where zinc oxide is employed as the filler, it is unnecessary to utilize additional accelerator-activating oxide.

Dispersion of the paracoumarone resin, filler and other compounding ingredients in the butadiene-styrene copolymer may be accomplished in various ways utilizing conventional equipment of the type employed for compounding natural rubber, e. g. rubber mills of the roll type or internal mixers such as the Banbury mixer. For example, a master batch of the copolymer and paracoumarone resin may be made by thoroughly dispersing in the copolymer a high proportion of paracoumarone resin, e. g. 20 to 100 parts by weight of the resin for each 100 parts of the copolymer, and milling a sufficient amount of the master batch with copolymer containing no resin and with the other compounding ingredients to produce a compound containing the desired proportions of the various materials. Alternatively, the sulfur may be first dispersed in the copolymer by milling and the other compounding ingredients then dispersed. If desired, the sulfur may be first dissolved in the paracoumarone resin by heating the sulfur and resin together, the resultant resin-sulfur blend dispersed in the copolymer followed by dispersion of the filler, activating metal oxide and accelerator. It is desirable, particularly when employing accelerators having a tendency to scorch the copolymer, to incorporate the accelerator after the other compounding materials in order to prevent scorching during the compounding operation.

The following examples are further illustrative of the invention:

Example 1

| | Parts by weight |
|---|---|
| Butadiene-styrene copolymer | 100 |
| Paracoumarone resin (melting point 115°–125° C.) | 25 |
| Aluminum oxide | 25 |
| Zinc oxide | 5 |
| Sulfur | 2 |
| Benzothiazyl-2-monocyclohexyl sulfenamide (accelerator) | 1.75 |
| Total | 208.75 |

The paracoumarine resin employed was produced by polymerization of the resin-forming constituents of coal-tar and water-gas-tar distillate fractions boiling within the range of 150° to 200° C. with concentrated (66° Bé.) sulfuric acid and was constituted chiefly of the polymers of indene, coumarone and homologs of styrene. The aluminum oxide was a finely divided hydrated product of an average particle size of less than 1 micron and was employed in amount equal to about 22 parts by volume per 100 parts by volume of the butadiene-styrene copolymer. The butadiene-styrene copolymer was milled for 5 to 10 minutes at mill roll temperature of about 130° F. and the sulfur, zinc oxide and aluminum oxide were added while milling at this temperature. The mill roll temperature was then elevated to 170° to 180° F. and the paracoumarone resin was added; within several minutes the resin was completely dispersed in the copolymer. The batch was then removed from the mill, allowed to cool for several hours, and the accelerator was then milled into the copolymer at mill roll temperatures below 130° F. The compound was then cured for 30 minutes at 307° F. corresponding to a steam pressure (gauge) of about 60 pounds per square inch.

Example 2

Butadiene-styrene copolymer was compounded and cured for 30 minutes in the same manner as described in Example 1 except that instead of aluminum oxide 115 parts by weight of titanium dioxide were employed as the filler. This amount of titanium dioxide provided about 29.5 parts by volume of the filler for each 100 parts by volume of the copolymer.

Example 3

Butadiene-styrene copolymer was compounded and cured for 30 minutes in the same manner as described in Example 1 except that 150 parts by weight of red iron oxide ($Fe_2O_3$) of an average particle size less than 1 micron were employed instead of aluminum oxide as the filler. The amount of iron oxide was sufficient to provide 29 parts by volume of the filler to 100 parts by volume of the copolymer.

Example 4

| | Parts by weight |
|---|---|
| Butadiene-styrene copolymer | 100 |
| Paracoumarone resin (melting point 115°–125° C.) | 25 |
| Zinc oxide | 150 |
| Sulfur | 2 |
| Benzothiazyl-2-monocyclohexyl sulfenamide (accelerator) | 1.75 |
| Total | 278.75 |

The ingredients were assembled as described in Example 1 and were then cured for 30 minutes at a temperature of about 307° C. corresponding to a steam pressure of approximately 60 pounds per square inch.

The vulcanizates of Examples 1, 2 and 4 were light in color and the vulcanizate of Example 3 was read. The vulcanizates were tested both before aging and after aging for 7 days at 70° C. The test results on the vulcanizate of Example 1, which are illustrative of the results on the vulcanizates of the other examples, are given below. The results of similar tests on a vulcanizate which contained no paracoumarone resin but which otherwise contained the same materials and was made by the same procedure as the vulcanizate of Example 1 are also given for purposes of comparison:

| | Properties of Vulcanizate of Example 1 | Properties of Vulcanizate containing no paracoumarone resin |
|---|---|---|
| Tear resistance (Crescent) | 105 | 58 |
| Tensile strength (pounds per square inch): | | |
| Unaged | 1400 | 400 |
| Aged | 1400 | 300 |
| Elongation (per cent at breaking point): | | |
| Unaged | 740 | 430 |
| Aged | 630 | 300 |
| Modulus (300 per cent): | | |
| Unaged | 100 | 200 |
| Aged | 200 | 300 |

It will be observed that the tensile strength of the vulcanizate of Example 1 containing paracoumarone resin and aluminum oxide was much greater than that of the vulcanizate containing the same filler but no paracoumarone resin. The combination of the filler and resin also materially increased the tear resistance and the elongation at the breaking point and for given stress of the vulcanizates. Vulcanizates containing the combination of the metal oxide fillers and paracoumarone resin of this invention possess properties adapting them for use for most purposes for which non-black vulcanizates are required, while vulcanizates containing such fillers but no paracoumarone resin are not a satisfactory substitute for natural rubber vulcanizates.

Thus it will be seen the invention markedly improves the tensile properties and tear resistance of vulcanizates of butadiene-styrene copolymer compounded with metal oxide fillers. This improvement renders the vulcanizates suitable for many purposes for which non-black vulcanizates of butadiene-styrene copolymer formerly had no utility owing to their lower tensile strength and tear resistance. The invention provides a new class of vulcanizates suitable for the manufacture of articles such as drug sundries, e. g. hot water bottles, mechanical rubber goods, footwear and household articles, for which black vulcanizates are not commercially acceptable. The vulcanizates of the invention are primarily adapted for relatively static uses in which they are not subjected to a high degree of repeated flexure and deformation but in some cases may be employed for various dynamic purposes.

The resin melting points given herein are determined by the cube-in-mercury method described in "Protective and Decorative Coatings," vol. 1, copyright 1941 by J. J. Matiello, pages 366–367, published by John Wiley & Sons, Inc., New York, New York. The melting points of 75° C., 100° C. and 140° C. determined by this method correspond approximately to melting points of 69° C., 88° C. and 119° C., respectively, as determined by ring and ball method (A. S. T. M. Standard D 36–26). The properties of the rubber given herein were determined by the following methods: tear resistance (crescent) by A. S. T. M. method D 624–41T (pounds per inch thickness); tensile strength, modulus and elongation by A. S. T. M. method D 412–41 (¼" die).

Since certain changes may be made without departing from the scope of the invention, it is intended that the above shall be interpreted as illustrative and not in a limiting sense.

I claim:

1. A process of making vulcanizates of vulcanizable butadiene-styrene copolymer which comprises compounding the copolymer with vulcanizing agent, paracoumarone resin of a melting point of at least 75° C. and metal oxide filler selected from the group consisting of aluminum oxide, iron oxide, titanium dioxide and zinc oxide, in proportions of from 15 to 30 parts by weight of the resin to 100 parts by weight of the copolymer and at least 20 parts by volume of filler to 100 parts by volume of the copolymer, and vulcanizing the resultant compound to a resilient vulcanizate.

2. A process as specified in claim 1 in which the filler is hydrated aluminum oxide of an average particle size of less than 1 micron.

3. A process as specified in claim 1 in which the filler is red iron oxide of an average particle size less than 1 micron.

4. A process as specified in claim 1 in which the filler is zinc oxide of an average particle size less than 1 micron.

5. A process of making butadiene-styrene copolymer vulcanizates of improved tensile strength and tear resistance which comprises compounding vulcanizable butadiene-styrene copolymer with from 20 to 60 parts by volume of metal oxide filler per 100 parts by volume of the copolymer, said filler being selected from the group consisting of aluminum oxide, iron oxide, titanium dioxide and zinc oxide, and 15 to 30 parts by weight of paracoumarone resin of a melting point of 100° to 140° C. per 100 parts by weight of the copolymer, from 1 to 5 parts by weight of sulfur per 100 parts by weight of copolymer, and vulcanizing accelerator, the compounded copolymer containing from 3 to 10 parts by weight of an accelerator-activating metallic oxide per 100 parts by weight of the copolymer, and vulcanizing the resultant compound.

6. A process of making butadiene-styrene copolymer non-black vulcanizates of improved tensile strength and tear resistance which comprises compounding vulcanizable butadiene-styrene copolymer with from 20 to 60 parts of metallic oxide filler per 100 parts by volume of the copolymer, said filler being selected from the group consisting of aluminum oxide, iron oxide, titanium dioxide and zinc oxide, from 15 to 30 parts by weight of paracoumarone resin of a melting point of from 100° to 140° C. per 100 parts by weight of the copolymer, from 1 to 5 parts by weight of sulfur per 100 parts by weight of copolymer, and vulcanizing accelerator, the compounded copolymer containing from 3 to 10 parts by weight of zinc oxide per 100 parts by weight of the copolymer, and vulcanizing the resultant compound.

7. A vulcanizate prepared by vulcanizing vulcanizable butadiene-styrene copolymer having dispersed therein vulcanizing agent, paracoumarone resin of a melting point of at least 75° C. and metal oxide filler of the group consisting of aluminum oxide, iron oxide, titanium dioxide and zinc oxide, said filler being present in amount of at least 20 parts by volume for each 100 parts by volume of said copolymer and said paracoumarone resin being present in amount of from 15 to 30 parts by weight per 100 parts by weight of said copolymer, and said vulcanizing agent and said filler being present in amounts to yield a resilient vulcanizate.

8. A vulcanizate as specified in claim 7, in which the filler is hydrated aluminum oxide, at least 90% of which is of a particle size not exceeding 15 microns.

9. A vulcanizate as specified in claim 7 in which the filler is red iron oxide, at least 90% of which is of a particle size not exceeding 15 microns.

10. A vulcanizate as specified in claim 7 in which the filler is zinc oxide, at least 90% of which is of a particle size not exceeding 15 microns.

11. A vulcanizate prepared by vulcanizing vulcanizable butadiene-styrene copolymer having dispersed therein per 100 parts by weight of copolymer 15 to 30 parts by weight of paracoumarone resin of melting point at least 75° C., 1 to 5 parts by weight of sulfur, accelerator, and from 3 to 10 parts by weight of accelerator-activating metallic oxide; and per 100 parts by volume of copolymer 20 to 60 parts by volume of hydrated aluminum oxide filler of an average particle size less than 1 micron.

THEODORE A. BULIFANT.

REFERENCES CITED

The following references are of record in the file of this patent:

The compounding of Buna S, by H. L. Lawrence, Report No. 42-4, published by Rubber Chemicals Division of E. I. du Pont de Nemours & Co., December 1942, pages 6-8.

Cumar, published by the Barrett Company, Feb. 1937, pages 12 and 13.